United States Patent
Li

(10) Patent No.: US 8,315,045 B2
(45) Date of Patent: Nov. 20, 2012

(54) PORTABLE ELECTRONIC DEVICE USING SLIDABLE KEYPAD

(75) Inventor: Jun Li, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 317 days.

(21) Appl. No.: 12/764,190

(22) Filed: Apr. 21, 2010

(65) Prior Publication Data

US 2011/0063788 A1 Mar. 17, 2011

(30) Foreign Application Priority Data

Sep. 14, 2009 (CN) .......................... 2009 1 0306965

(51) Int. Cl.
*H05K 5/00* (2006.01)
*H05K 7/00* (2006.01)
*H04M 1/00* (2006.01)

(52) U.S. Cl. ......... 361/679.11; 361/679.12; 361/679.13; 455/575.1; 455/575.4

(58) Field of Classification Search ............. 361/679.11, 361/679.12, 679.13; 455/575.1, 575.4
See application file for complete search history.

(56) References Cited

U.S. PATENT DOCUMENTS

| | | | |
|---|---|---|---|
| 6,947,778 B2 * | 9/2005 | Tsai ........................... | 455/575.4 |
| 7,120,458 B2 * | 10/2006 | Wendorff et al. .......... | 455/550.1 |
| 7,889,483 B2 * | 2/2011 | Sip et al. ................. | 361/679.11 |
| 2005/0272488 A1 * | 12/2005 | Zou ............................ | 455/575.4 |
| 2007/0021160 A1 * | 1/2007 | Li ............................... | 455/575.4 |
| 2008/0207272 A1 * | 8/2008 | Thornton et al. ............ | 455/566 |
| 2009/0312076 A1 * | 12/2009 | Lim ........................... | 455/575.4 |

* cited by examiner

*Primary Examiner* — Anthony Haughton
(74) *Attorney, Agent, or Firm* — Altis Law Group, Inc.

(57) ABSTRACT

A portable electronic device includes a housing, a resisting member and a keypad. The housing has a receiving recess running through two sides of the housing. The resisting member is formed on the bottom of the receiving recess. The keypad has a plurality of receiving cavities formed at the bottom surface. The keypad is hold by engagement of a receiving cavity with the resisting member and can slid by pushing of the keypad until another receiving cavity receives the resisting member.

13 Claims, 5 Drawing Sheets

PORTABLE ELECTRONIC DEVICE USING SLIDABLE KEYPAD

BACKGROUND

1. Technical Field

The present disclosure relates to portable electronic devices and, particularly to a portable electronic device having a slidable keypad.

2. Description of Related Art

Typically, a portable electronic device such as mobile phone has a stationary keypad secured within a housing. The keypad includes a plurality of adjacent keys arranged thereon. Due to the arrangement of keys, it is awkward to press one key without contacting or pressing another adjacent key, particularly when the user holds the electronic device with only one hand to press the various keys with a thumb of one hand.

Therefore, there is room for improvement within the art.

BRIEF DESCRIPTION OF THE DRAWING

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
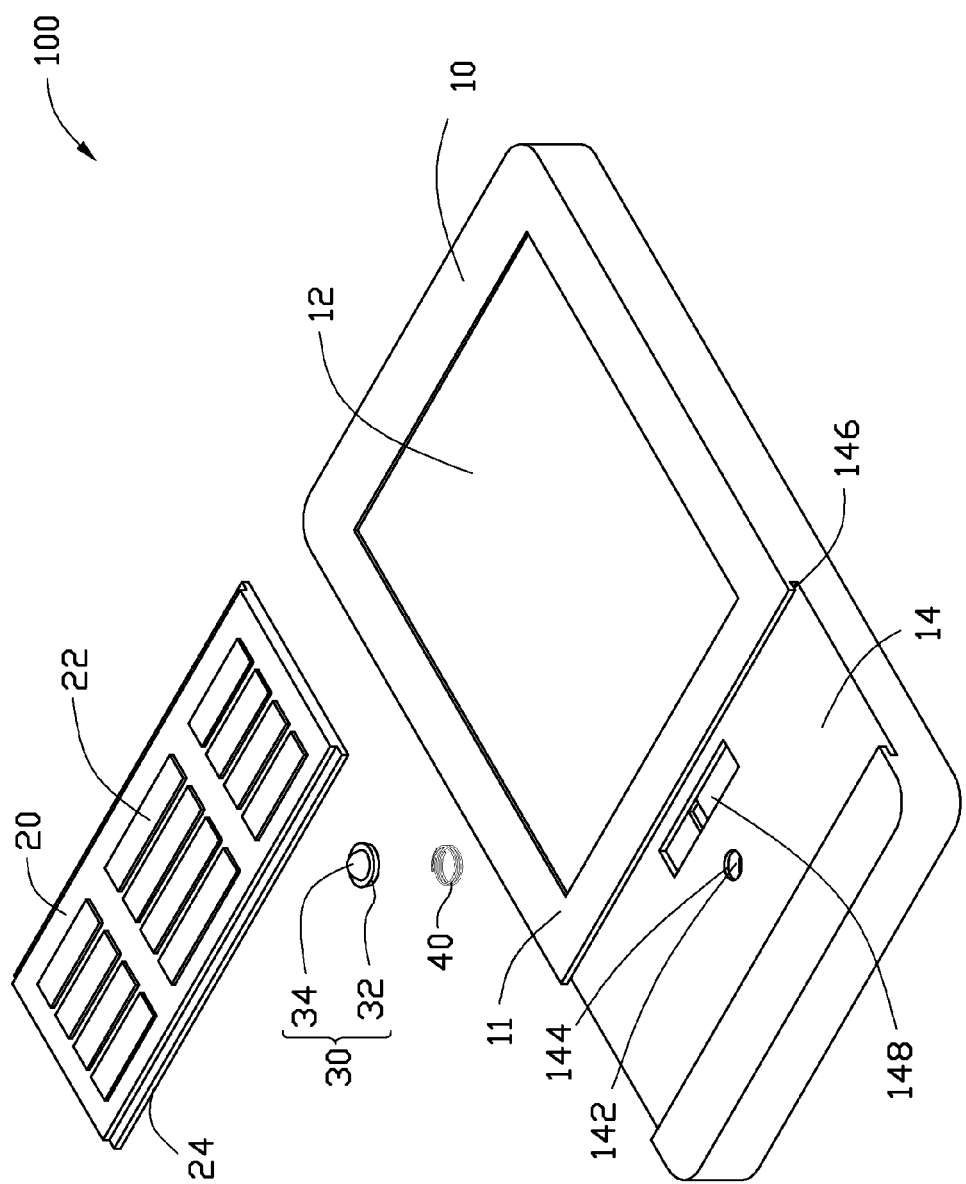
FIG. 1 is an exploded, isometric view of a portable electronic device using slidable keypad according to an exemplary embodiment.

FIG. 1 shows an exemplary portable electronic device 100, such as a mobile phone. The portable electronic device 100 includes a housing 10, a keypad 20, a resisting member 30 and an elastic member 40.

The housing 10 has an upper surface 11. The upper surface 11 has a display 12 and a receiving recess 14 adjacent to the display 12. The receiving recess 14 is generally rectangular and defined through both opposite sides of the housing 10. The bottom wall of the receiving recess 14 defines an assembling hole 142 and an annular groove 144 at the center. The annular groove 144 is defined inside the assembling hole 142 for latching the resisting member 30 within the assembling hole 142. The two opposite side walls of the receiving recess 14 define two opposite guiding grooves 146 for engaging and guiding the keypad 20. The bottom wall of the receiving recess 14 also defines a chamber 148 to assemble a flexible printed circuit board (not shown) therein. The flexible printed circuit board electronically connects the keypad 20 to the rest of the electronic components of the electronic device 100. The flexible printed circuit board can be retractably received in the chamber 148 and moves along with the lateral movement of the keypad 20 with respect to the housing 10.

Figure 2:
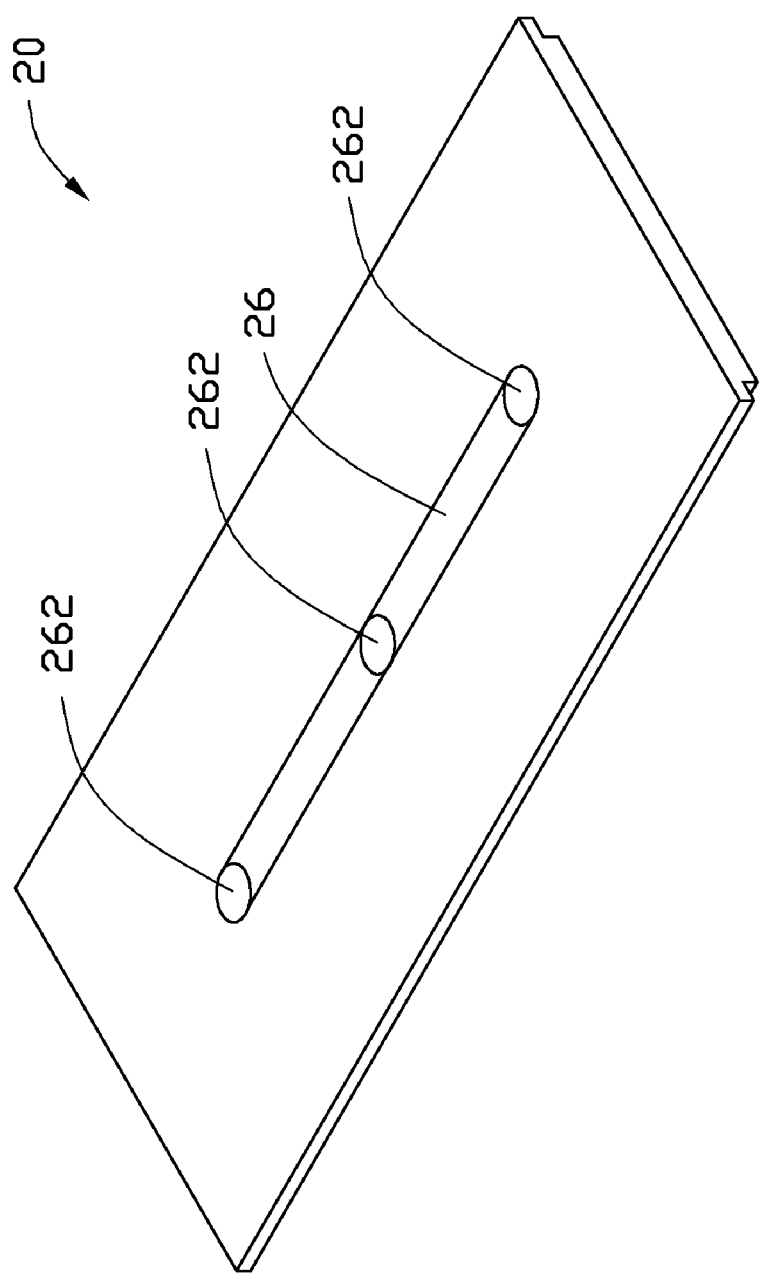
FIG. 2 is an isometric view of a back of the keypad shown in FIG. 1.

The keypad 20 can be slidably received in the receiving recess 14. The keypad 20 includes a plurality of keys 22 on the top surface and two opposite flanges 24 laterally extending from two sides of the top surface. The flanges 24 engage into the two guiding grooves 146 respectively. Referring further to FIG. 2, the keypad 20 defines a slot 26 extending in parallel with the flange 24. The bottom wall of the slot 26 defines three evenly spaced receiving cavities 262. The resisting member 30 can engage into each of the receiving cavities 262.

The resisting member 30 includes a latching end 32 and a resisting end 34. The latching end 32 is an elastic column. The latching end 32 is slightly larger than the assembling hole 142 in diameter and substantially the same diameter as the annular groove 144. The resisting end 34 can be hemispheric, protruding from the center of the latching end 32. The resisting end 34 resists and engages in the receiving cavity 26. The elastic member 40 can be a coiled spring.

Figure 3:
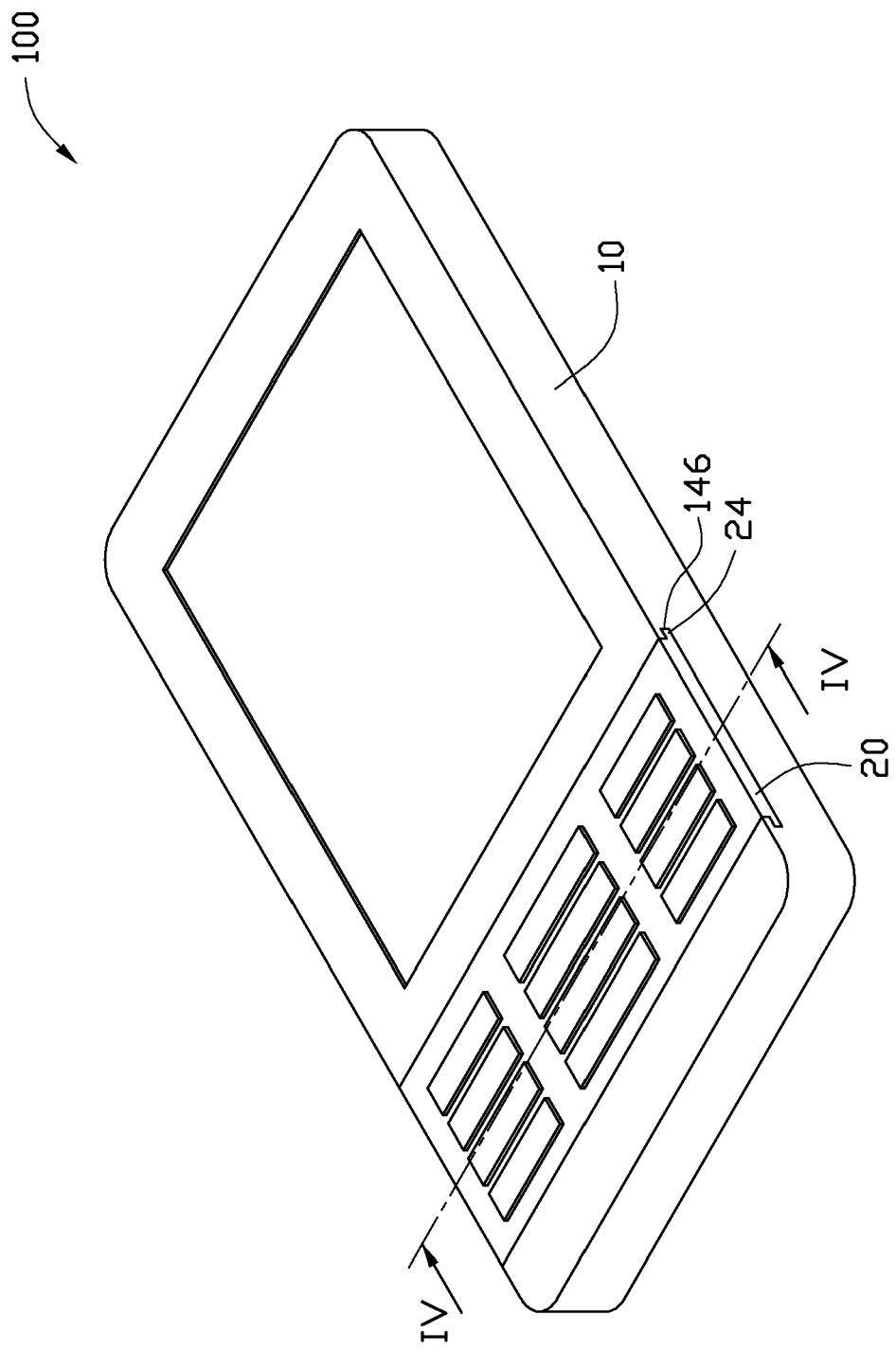
FIG. 3 is an assembled, isometric view of the portable electronic device shown in FIG. 1.
Figure 4:
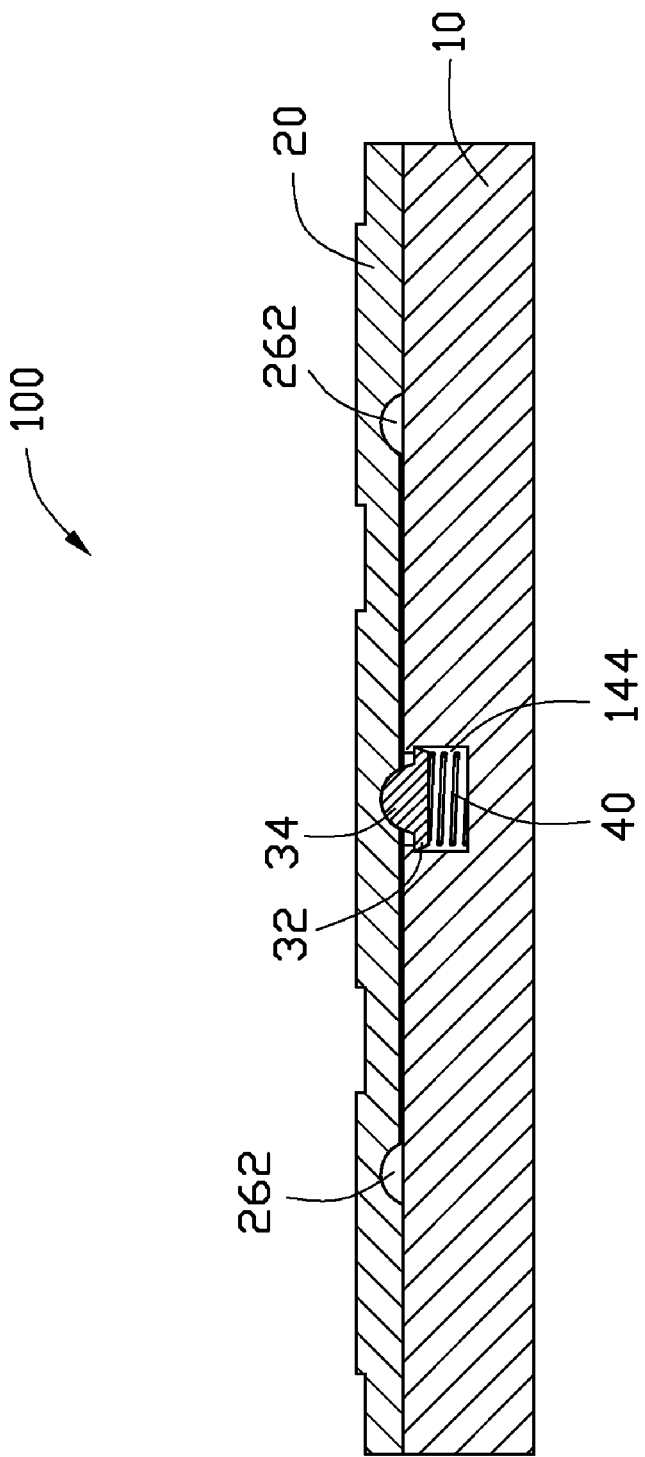
FIG. 4 is a cross sectional view of the portable electronic device shown in FIG. 1 taken along line IV-IV.

Referring to FIGS. 3 and 4, during assembly of the electronic device 100, the elastic member 40 is mounted to the assembling hole 142. The resisting member 30 engages into the housing 10. The latching end 32 of the resisting member 30 is pressed into the assembling hole 142 and latched into the annular groove 144. The resisting end 34 is exposed relative to the assembling hole 142. Accordingly, the elastic member 40 is compressed by the latching end 32. The keypad 20 is installed to the receiving recess 14 of the housing 10, and the two flanges 24 slide into the two guiding grooves 146 respectively. In this case, the keypad 20 can slide along the receiving recess 14, with the resisting end 34 sliding to engage and latch into the middle receiving cavity 262.

Figure 5:
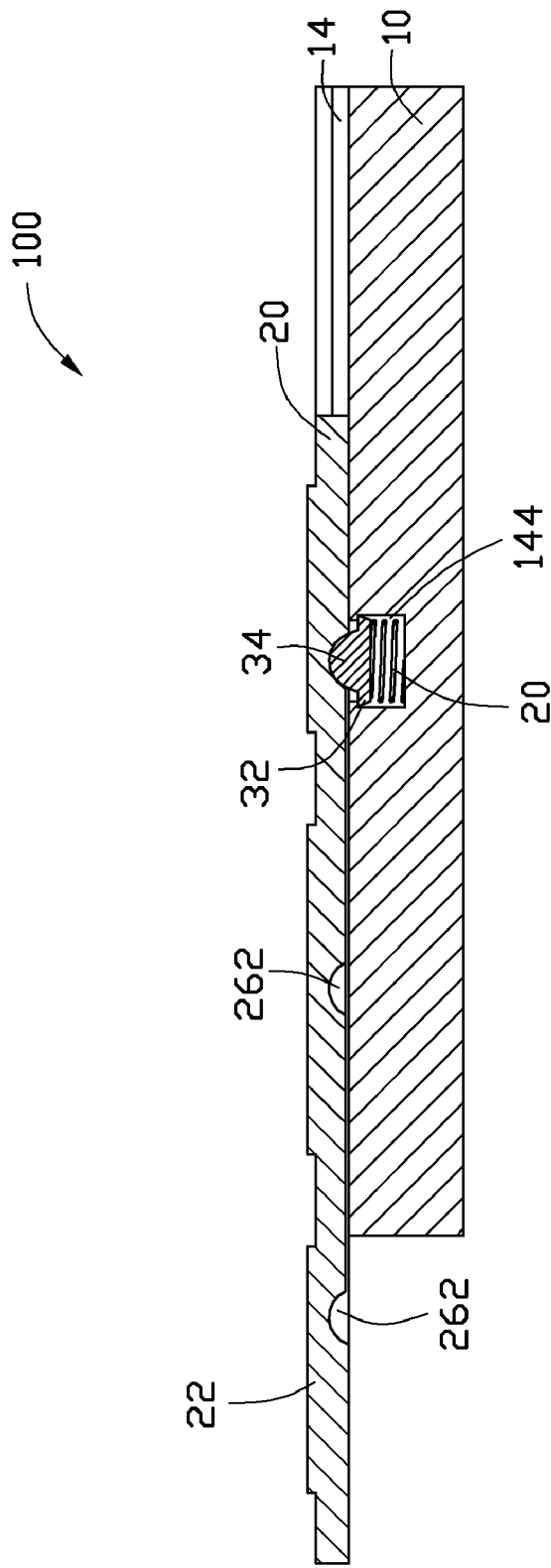
FIG. 5 is a cross sectional view of the portable electronic device shown in FIG. 1 with the keypad slid.

Referring to FIG. 5, the keypad 20 can slide along the receiving recess 14 by pushing the keypad 20 to detach from the middle receiving cavity 262 until the resisting end 34 engages and latches into another adjacent receiving cavity 262. At this time, the end of the keypad 20 exposes from the receiving recess 14 to the outside and the other end of the keypad 20 moves further into the receiving recess 14.

It is noteworthy, that the two flanges 24 of the keypad 20 can be omitted, and the guiding grooves 146 can be omitted. The latching end 32 of the resisting member 30 is perpendicularly latched into the slot 26 of the keypad 20, the latching end 32 of the resisting member 30 is secured to the receiving recess 14, and the resisting member 30 can slide along the slot 26.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
a housing having a first surface and two opposite second surfaces extending from two opposite edges of the first surface, a receiving recess defined in one end of the first surface and extending through the two second surfaces, and a display mounted on another end of the first surface, the receiving recess having a resisting member formed in a bottom center of the receiving recess;
a keypad slidably received in the receiving recess and coplanar with a top of the display, the keypad comprising a plurality of keys arranged on a top surface thereof and exposed from the receiving recess, and defining a first receiving cavity, a second receiving cavity, and a third receiving cavities on an opposite bottom surface arranged in a line, the first, second and third receiving cavities receivable with the resisting member respectively;

wherein when the resisting member is received in the second receiving cavity, the keypad is completely received in the receiving recess, and two opposite sides of the keypad are respectively coplanar with the second surfaces; when the keypad is pushed toward one of the second surfaces and extends out of one of the second surfaces for exposing one part of the receiving recess, the resisting member is received in one of the first receiving cavity and the third receiving cavity.

2. The portable electronic device as claimed in claim 1, wherein the receiving recess defines two guiding grooves at two opposite sides, the keypad protrudes laterally two flanges at opposite sides to engage into the guiding grooves correspondingly.

3. The portable electronic device as claimed in claim 2, wherein the keypad defines a slot at the bottom surface, the slot defines three evenly spaced receiving cavities at the bottom.

4. The portable electronic device as claimed in claim 1, wherein the receiving recess defines an assembling hole at the bottom, the resisting member includes a latching end and a resisting end, the latching end is latched into the assembling hole and the resisting end is exposed from the assembling hole.

5. The portable electronic device as claimed in claim 4, wherein the portable electronic device includes an elastic member, the elastic member is assembled in the assembling hole and resists against the latching end of the resisting member.

6. The portable electronic device as claimed in claim 4, wherein the latching end is a elastic column, the resisting end is a hemisphere and protrudes from the latching end.

7. The portable electronic device as claimed in claim 4, wherein the assembling hole defines an annular groove at the center, the latching end of the resisting member latches into the annular groove.

8. A portable electronic device, comprising:
a housing having a first surface and two opposite second surfaces extending from two opposite edges of the first surface, a receiving recess defined in one end of the first surface and extending through the two second surfaces, and a display mounted on another end of the first surface, the receiving recess defining two guiding grooves at two sides thereof;
a resisting member forming on a bottom of the receiving recess;
a keypad slidable in the receiving recess and coplanar with the plane of the display, the keypad having flanges formed at two sides, a plurality of keys arranged on a top surface thereof, and a first receiving cavity, a second receiving cavity and a third receiving cavity defined on an opposite bottom surface to hold the resisting member, the first, second and third receiving cavities are arranged in a line, the second receiving cavity positioned between the first receiving cavity and the third receiving cavity;
wherein the keypad is slidably received in the receiving recess and the keys are exposed from the receiving recess, the two flanges engages into the two guiding grooves correspondingly;
when the resisting member is received in the second receiving cavity, the keypad is completely received in the receiving recess, and two opposite sides of the keypad are respectively coplanar with the second surfaces;
when the keypad is pushed toward one of the second surfaces and extends out of one of the second surfaces for exposing one part of the receiving recess, the resisting member is received in one of the first receiving cavity and the third receiving cavity.

9. The portable electronic device as claimed in claim 8, wherein the keypad defines a slot at the bottom surface, the slot the slot defines three evenly spaced receiving cavities.

10. The portable electronic device as claimed in claim 8, wherein the receiving recess defines an assembling hole at the bottom, the resisting member includes a latching end and a resisting end, the latching end is latched into the assembling hole and the resisting end exposes from the assembling hole.

11. The portable electronic device as claimed in claim 10, wherein the portable electronic device includes an elastic member, the elastic member is assembled in the assembling hole and resists against the latching end of the resisting member.

12. The portable electronic device as claimed in claim 10, wherein the latching end is an elastic column, the resisting end is a hemisphere and protrudes from the latching end.

13. The portable electronic device as claimed in claim 10, wherein the assembling hole forms an annular groove at the center, the latching end of the resisting member is latched into the annular groove.

\* \* \* \* \*